April 3, 1956   H. E. VAN VALKENBURG ET AL   2,740,289
AUTOMATIC SCANNING AND RECORDING DEVICE FOR
ULTRASONIC INSPECTION OF MATERIALS
Filed March 20, 1953   3 Sheets-Sheet 1

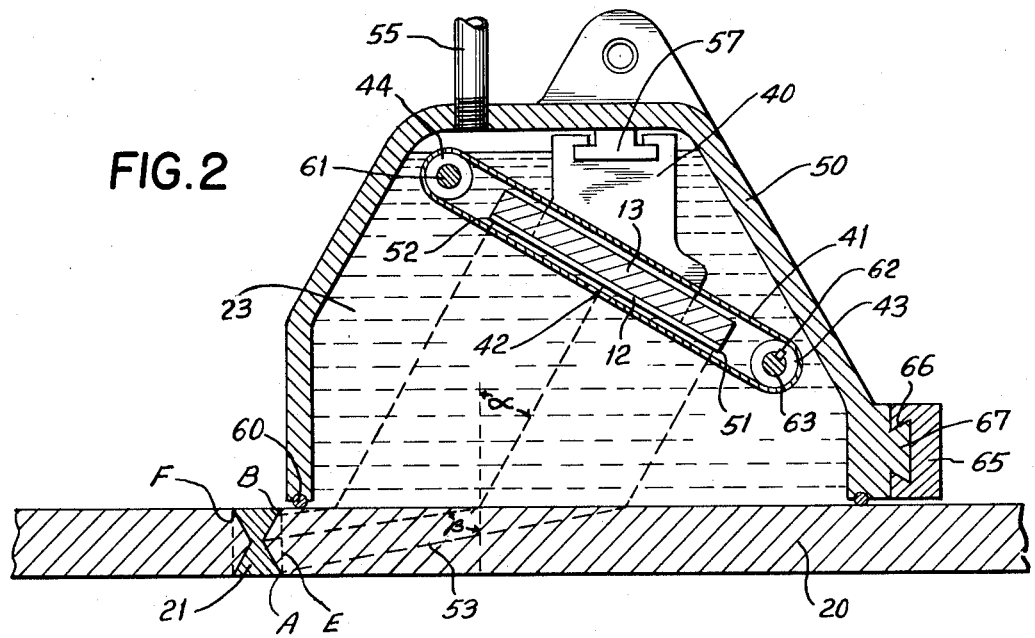
FIG.2
FIG.5
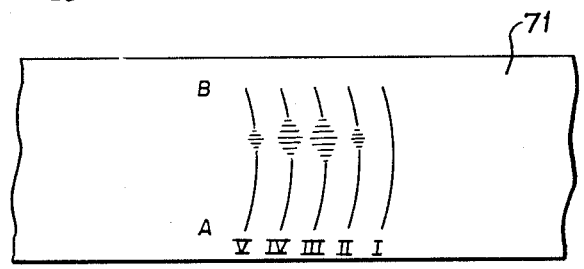
FIG.4

United States Patent Office 2,740,289
Patented Apr. 3, 1956

2,740,289

AUTOMATIC SCANNING AND RECORDING DEVICE FOR ULTRASONIC INSPECTION OF MATERIALS

Howard E. Van Valkenburg, Candlewood Isle, and Edward G. Cook, Brookfield, Conn., assignors to Sperry Products, Inc., Danbury, Conn., a corporation of New York Application March 20, 1953, Serial No. 343,614

8 Claims. (Cl. 73—67)

This invention relates to the automatic inspection of materials by ultrasonic means. The invention relates more particularly to those applications where a predetermined region of material is to be inspected by ultrasonic pulses, as in the case of long welded sections. The inspection of such a region calls for the utilization of scanning means whereby the entering acoustic beam can be varied in its relation to the section to be inspected so that the entire selected region may be inspected. It is one of the principal objects of this invention to provide a novel scanning means whereby such inspection may be accomplished.

It is a further object of this invention to provide in combination with such scanning mechanism, means for permanently and automatically recording the results of the inspection.

Further objects and advantages of this invention will become apparent in the following detailed description thereof.

In the accompanying drawings,

Fig. 2 is a vertical section through the scanning unit of Fig. 1.

Fig. 4 is a plan view of a portion of a recorder chart shown in Fig. 1.

Fig. 5 is a graphic representation which relates the lengthwise sections of the material under inspection with the recorder chart indications as shown in Fig. 4.

Figure 1:
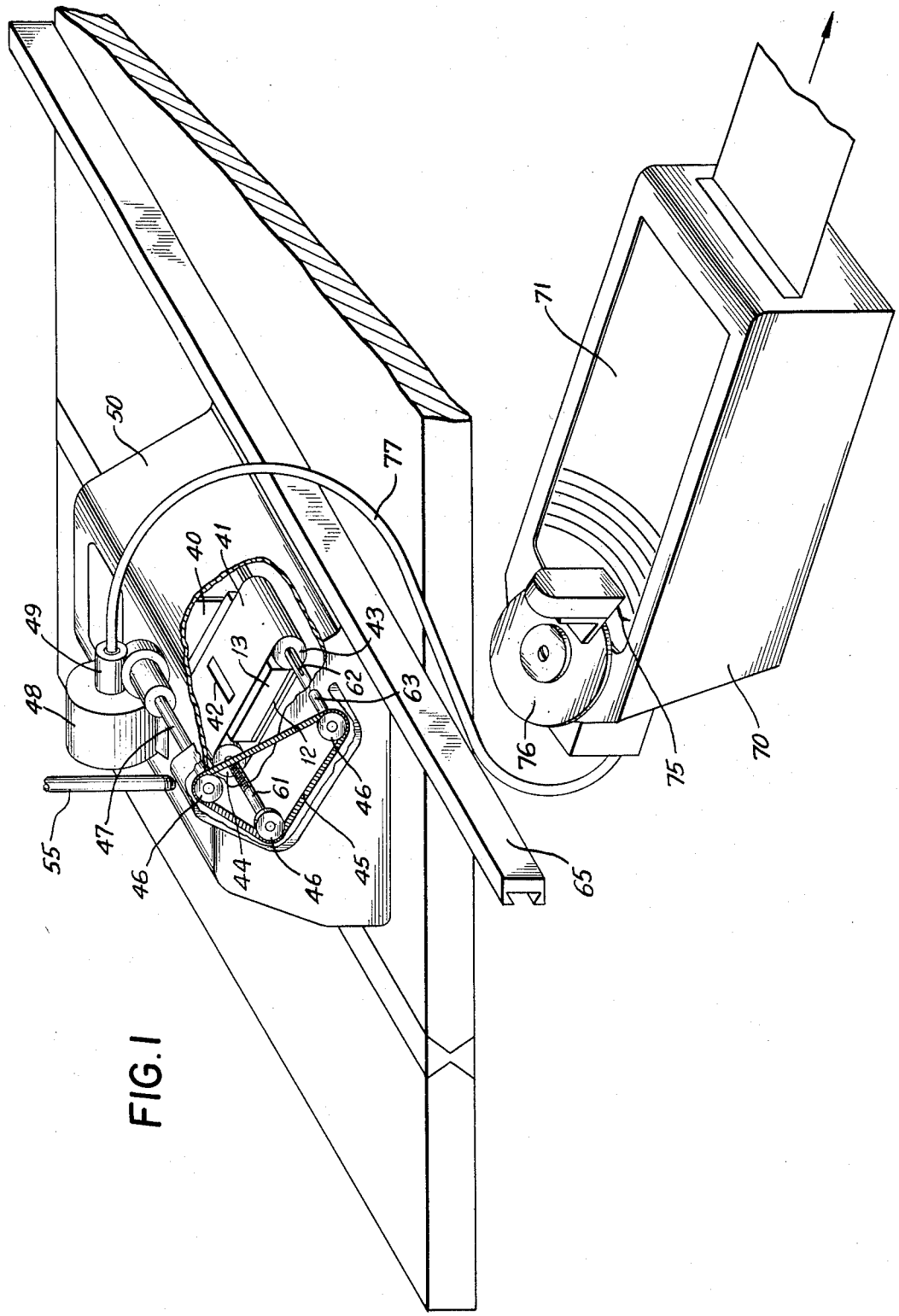
Fig. 1 is an assembly comprising isometric projections of the component units with parts broken away to disclose certain of the interior mechanism.

Referring to the drawings, it will be seen that this invention is illustrated as applied to the testing of long weld sections, but it will become apparent from the following description that the invention has general application to the testing of entire predetermined sections of material throughout their length and depth.

Figure 3:
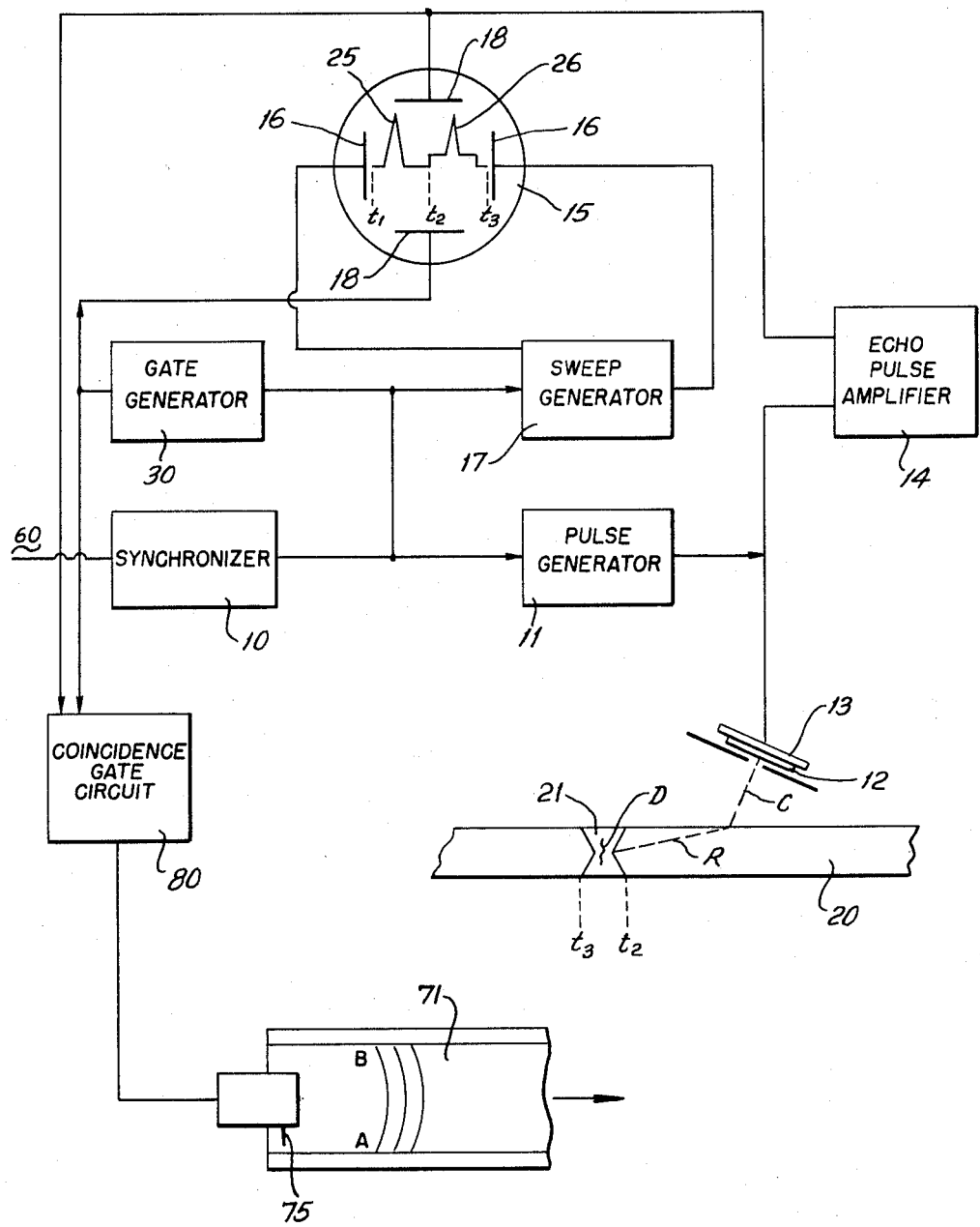
Fig. 3 is a wiring diagram illustrating the fundamental operation of a reflectoscope testing system and showing the scanning and recording mechanism of Fig. 1 diagrammatically.

The invention contemplates the employment of standard reflectoscope technique. Such technique calls for the employment of standard reflectoscope mechanism as illustrated in Fig. 3 which may comprise a synchronizer 10 adapted to be energized periodically, as from a suitable source of 60-cycle alternating current. The synchronizer trips a pulse generator 11 which generates wave trains or pulses periodically at the prescribed rate and applies said pulses to a transducer which may take the form of a piezoelectric crystal 12 having a backing 13, to vibrate the crystal at ultrasonic frequency for the duration of each pulse. The pulse which is applied to the crystal is also applied to an amplifier 14 whose output may be indicated on a suitable indicator, such as an oscillosocpe 15 having horizontal plates 16 between which a sweep is generated by a sweep generator 17 which may be triggered by the synchronizer 10 so that the sweep and pulse will be synchronized. The output from amplifier 14 is applied to vertical plates 18 of the oscilloscope to cause deviations of the sweep in response to amplifier output. The high-frequency electric pulse which vibrates the crystal 12 results in a high-frequency sound wave being transmitted into the object 20 under inspection, and said beam will travel into said object until some reflecting surface is encountered. Such a reflecting surface may be the flaw D within a weld section 21 in the object 20. On encountering said flaw the pulse is reflected back to the crystal 12 which converts the reflected ultrasonic energy into electric vibrations of a given voltage, and said voltage is applied to the input of amplifier 14, and, after being amplified, is applied to the vertical plates 18 to cause vertical deviation of the horizontal sweep. Thus normally the sweep would show a deflection 25 corresponding to the transmitted pulse and, if a flaw were present to reflect the transmitted pulse from within the object under inspection, another deviation 26 would appear displaced in time along the horizontal sweep. If, as in the present invention, it is desired to select signals issuing from the weld section, a gate generator 30 may be provided in the circuit of the sweep generator to select the portion of the sweep for a time interval $t_3 - t_3$. The boundary E could be represented on the face of the cathode ray tube 15 by a time $t_2$ where said time $t_2$ is a fixed time interval after time $t_1$, and where said time $t_1$ is the time the initial acoustic pulse is sent out from crystal 12. This initial acoustic pulse is represented by deflection 25. Likewise, the boundary F of the weld region 21 could be represented on the face of the cathode ray tube 15 by a time $t_3$, where said time $t_3$ is a fixed time interval after $t_1$. It is apparent that any reflections originating from flaws between the boundaries E and F and going through amplifier 14 would appear on the face of the tube 15 as a deflection 26 between times $t_2$ and $t_3$.

Times $t_2$ and $t_3$ can be adjusted for the region being inspected.

In the following description the "width" of the section E—F being tested is the horizontal distance in the section shown in Fig. 2, the "depth" of the section is the vertical distance in the section of Fig. 2, and the "length" of the section is the distance in a direction perpendicular to the plane of the paper in Fig. 2.

Where it is desired to test a section of an object, as for instance the weld section 21 of plate 20, and such inspection is desired for the entire depth, width and length of the weld section, it is necessary to provide some means for scanning the section, i. e., for causing the transmitted pulses to strike the section progressively from one point to another, said points defining the limits of the section to be inspected. Various scanning means have heretofore been proposed which comprise swinging the transducer 12 through an angular distance so that the incident beam C and refracted beam R (see Fig. 3) will assume different angular relationships with respect to object 20 and cause refracted beam R to sweep through a section within the object. Such pivoted transducer raised various problems associated with mechanically rocking the search unit and also might require computing systems composed of very complex electronic gating and sweep circuits. Furthermore such scanning methods usually required the use of a long persistence cathode ray oscilloscope which has the inherent limitation that no permanent record of the inspection is obtained.

The scanning method and apparatus herein employed is based upon the principle that if a beam is angularly disposed with respect to the normal to the surface of a material to be tested, and said beam is moved linearly relative to said section, it will intercept the section at progressive points throughout the depth thereof, and the angular relationship can be so arranged that the beam will intercept the section progressively from one end of the depth to the other. For this purpose the transducer 12 and its backing 13 are mounted by a bracket 40 slidably mounted within a casing 50 on guide rail 57, the bracket engaging the side edge of the transducer. One such apparatus comprises an endless belt 41 having a slit 42, said belt operating over rollers 43 and 44 so that the belt travels over and under the transducer. The rollers 43, 44 may be driven by a chain 45 extending over roller 46 on a shaft 47 driven from a motor 48 through gearing 49. Thus it will be seen that once each traverse of the belt the slit 42 will travel from the lower edge 51 of the crystal past the face of the crystal to its upper edge 52. Throughout this period the pulses generated by the crystal are being transmitted through the slit 42 at the predetermined angle of incidence α and are being refracted at the angle of refraction β. It will thus be apparent (Fig. 2) that the refracted beam 53 is striking the section 21 to be tested at a point A where the section begins. It is also apparent that as the beam is carried upwardly toward limiting position 52, the refracted beam 53 moves upwardly on the section 21 and the limiting position may be so positioned that the refracted beam leaves the section 21 at the extreme upper end B. Thus without pivotally mounting the transducer there is obtained a scanning action by the refracted beam within the object 20 which completely scans the section 21 which is to be inspected.

The casing 50 is filled with a fluid 23 which is a good transmitter of ultrasonic vibrations, and the fluid is held from escaping by means of a gasket 60 by which the casing makes contact with the object 20. In operation the casing is applied to the object and is then filled with fluid through the liquid connection 55.

The apparatus described above will be effective to test a section of the depth and width of the material shown and for a length corresponding to the length of the crystal along the length of weld section. Since such length of crystal is usually on the order of ½ inch, it means that the device would have to be set up at successive ½ inch sections along the entire length to be inspected unless means were provided for causing the transducer and its cooperating belt to move lengthwise within casing 50. Such movement may be obtained by causing the roller 44 to have threaded engagement with the shaft 61 of one of the driving pulleys 46. The roller 43 has spline engagement 62 with the shaft 63 of another of the driving pulleys 46. By this means the transducer may be caused to move slowly lengthwise of the section to be inspected through the length of the casing 50. Greater length than that provided by casing 50 is obtained by movement of the casing to a further position along the length of the material to be inspected. For this purpose in the application shown where the casing 50 is to be moved lengthwise of a welded section 21 there may be provided a guiderail 65 with which the casing 50 has slidable engagement as through mortise and tenon connection 66—67.

As hereinbefore stated, any reflection received from the section being scanned will appear on the oscilloscope 15, but it is desirable in many cases that a permanent record of the inspection be obtained, either in addition to the oscilloscope indication or in lieu thereof. There is provided herein a method of making a permanent record of such inspection, said method comprising a recorder having the usual elements of a casing 70, a chart 71, and driving mechanism (not shown) for driving the chart at a constant rate in a longitudinal direction as indicated by the arrow. A scriber 75 is adapted to be moved periodically transversely of the chart in synchronism with the movement of the belt so that the scriber moves across the chart in substantially the same interval of time that the slit 42 in the belt moves across the face of the crystal, i. e., from position 51 to position 52. To obtain such synchronism of movement the scriber 75 may be mounted on a rotatable table 76 which is adapted to be rotated from motor 48 through a flexible drive 77 to suitable gearing (not shown) which will establish a one-to-one relationship between the movement of belt 41 and table 76.

The scriber 75 is adapted to be actuated in the usual manner by a voltage impulse from pulse amplifier 14 operating through a coincidence gate circuit 80 (Fig. 3) which is designed to be tripped by the coincidence of electrical signals from amplifier 14 and from gate generator 30 so that any output of amplifier 14 due to a reflection from within the boundaries of the predetermined section to be inspected will be effective to actuate said scriber. The scriber is preferably of the type, such as the brush oscillograph, in which the amplitude of movement thereof is a function of the magnitude of the received pulse. By referring to Fig. 4 it will be seen that each transverse line drawn by the scriber corresponds to the movement of the incident beam from 51 to 52 and of the refracted beam from A to B. Therefore the position along said transverse line corresponds to position from bottom to top of the section being inspected. Furthermore the lengthwise position along the chart has a corresponding relation to the lengthwise position of the transducer and tape along the section being inspected. Thus it will be apparent that the chart gives a permanent indication not only of the presence of a defect but of its size, location in depth, and lengthwise position in the object under inspection. This can be graphically shown (Fig. 5) by a plan view of the object being tested, subdivided into the lengthwise section representing the successive testing locations of casing 50. Since the chart shows the presence of a defect extending from section II to section V, the location of the defect in the tested section can be illustrated.

Having described our invention, what we claim and desire to secure by Letters Patent is:

1. A device for ultrasonically inspecting a predetermined section of an object, comprising means for transmitting an ultrasonic beam into the object and for receiving reflections from reflecting surfaces within said object, said means being positioned at such angle to the incident surface of the object as to refract the beam within the object toward one end of the section, and means positioned between and movable relative to the transmitting means and the object for periodically moving the beam along said surface toward the section to cause the refracted beam to travel along said section to the other end thereof.

2. A device as specified in claim 1, in which the means for transmitting an ultrasonic beam includes a piezo-electric element having a face inclined to the incident surface of the object, said means positioned between the transmitting means and the object comprising a movable member having an aperture therein, and means for moving the member with its aperture progressively relative to said face of the element.

3. A device as specified in claim 2, in which the movable member is an endless belt surrounding the element, and means for driving the belt continuously to cause periodic movement of the slit relative to the face of the object.

4. A device as specified in claim 3, in which the beam is transmitted into the object to traverse the depth of said section, the piezo-electric element and the belt are mounted for movement as a unit lengthwise of said screen, and means for moving the unit lengthwise of said section simultaneously with the driving of the belt.

5. A device as specified in claim 3, in which gating means are provided for limiting the reception of reflections to the reflections of the beam in traversing said section.

6. A device as specified in claim 5, including means for recording the received reflections.

7. A device as specified in claim 6, in which the recording means includes a chart movable in a given direction, a stylus movable at an angle to the chart direction, and means for synchronizing the movement of said belt and said stylus.

8. A device as specified in claim 7, in which the stylus moves through an amplitude which is a function of the magnitude of the received reflection.

References Cited in the file of this patent

UNITED STATES PATENTS

| | | |
|---|---|---|
| 2,527,986 | Carlin | Oct. 31, 1950 |
| 2,592,134 | Firestone | Apr. 8, 1952 |
| 2,628,335 | Drake | Feb. 10, 1953 |
| 2,660,054 | Pringle | Nov. 24, 1953 |
| 2,693,105 | Straehl et al. | Nov. 2, 1954 |

FOREIGN PATENTS

| | | |
|---|---|---|
| 70,301 | Norway | Apr. 23, 1946 |
| 685,275 | Great Britain | Dec. 31, 1952 |